United States Patent [19]

Robinson

[11] Patent Number: 5,482,362
[45] Date of Patent: Jan. 9, 1996

[54] ANTI-LOCK BRAKE CONTROL VALVE CONTROL MODULE

[75] Inventor: David S. Robinson, Ann Arbor, Mich.

[73] Assignee: Kelsey-Hayes Company, Romulus, Mich.

[21] Appl. No.: 390,254

[22] Filed: Feb. 17, 1995

Related U.S. Application Data

[63] Continuation of Ser. No. 286,584, Aug. 5, 1994, abandoned, which is a continuation of Ser. No. 999,420, Dec. 31, 1992, abandoned.

[51] Int. Cl.⁶ ..................................... B60T 8/36
[52] U.S. Cl. .................. 303/119.2; 303/113.1; 439/76.1
[58] Field of Search .............. 188/158; 303/119.2, 303/113.1; 137/598.17; 335/202; 439/76, 672; 336/192

[56] References Cited

U.S. PATENT DOCUMENTS

| | | |
|---|---|---|
| 3,719,401 | 3/1973 | Peruglia ................... 303/119.2 |
| 3,854,501 | 12/1974 | Machek . |
| 3,936,096 | 2/1976 | Cumming . |
| 4,705,324 | 11/1987 | Kervagoret . |
| 4,796,958 | 1/1989 | Brown, Jr. . |
| 4,813,448 | 3/1989 | Leiber . |
| 4,828,335 | 5/1989 | Fuller et al. .............. 303/100 |
| 4,842,525 | 6/1989 | Galloway et al. . |
| 4,859,004 | 8/1989 | Nishii . |
| 4,922,121 | 5/1990 | Taft . |
| 4,927,212 | 5/1990 | Harrison et al. . |
| 4,929,038 | 5/1990 | Reinartz et al. . |
| 4,944,331 | 7/1990 | Tacket ..................... 303/119.2 |
| 4,976,501 | 12/1990 | Sivulka et al. . |
| 5,038,125 | 8/1991 | Vogel ....................... 336/192 |
| 5,040,853 | 8/1991 | Burgdorf et al. .......... 303/113.1 |
| 5,461,087 | 3/1995 | Godssens .................. 303/119.2 |

FOREIGN PATENT DOCUMENTS

| | | | |
|---|---|---|---|
| 2406169 | 8/1974 | Germany .............. 303/119.2 |
| 9212878 | 8/1992 | WIPO .................... 303/119.2 |

*Primary Examiner*—Matthew C. Graham
*Attorney, Agent, or Firm*—MacMillan, Sobanski & Todd

[57] ABSTRACT

An anti-lock brake system control valve having a removable coil support module mounted upon a valve body is disclosed. The module is divided into a first portion which carries solenoid coils for actuating valves in the valve body and a second sealed portion which carries an external electrical connector. The solenoid coils have lead wires extending into the second sealed portion where the lead wires are electrically joined to the external connector. The electrical connector connects the control valve to other electrical components of the anti-lock brake system. The module is readily accessible and removable for servicing. The module is separated from the brake system hydraulic circuit and can be removed from the valve body without disruption of the hydraulic circuit.

9 Claims, 11 Drawing Sheets

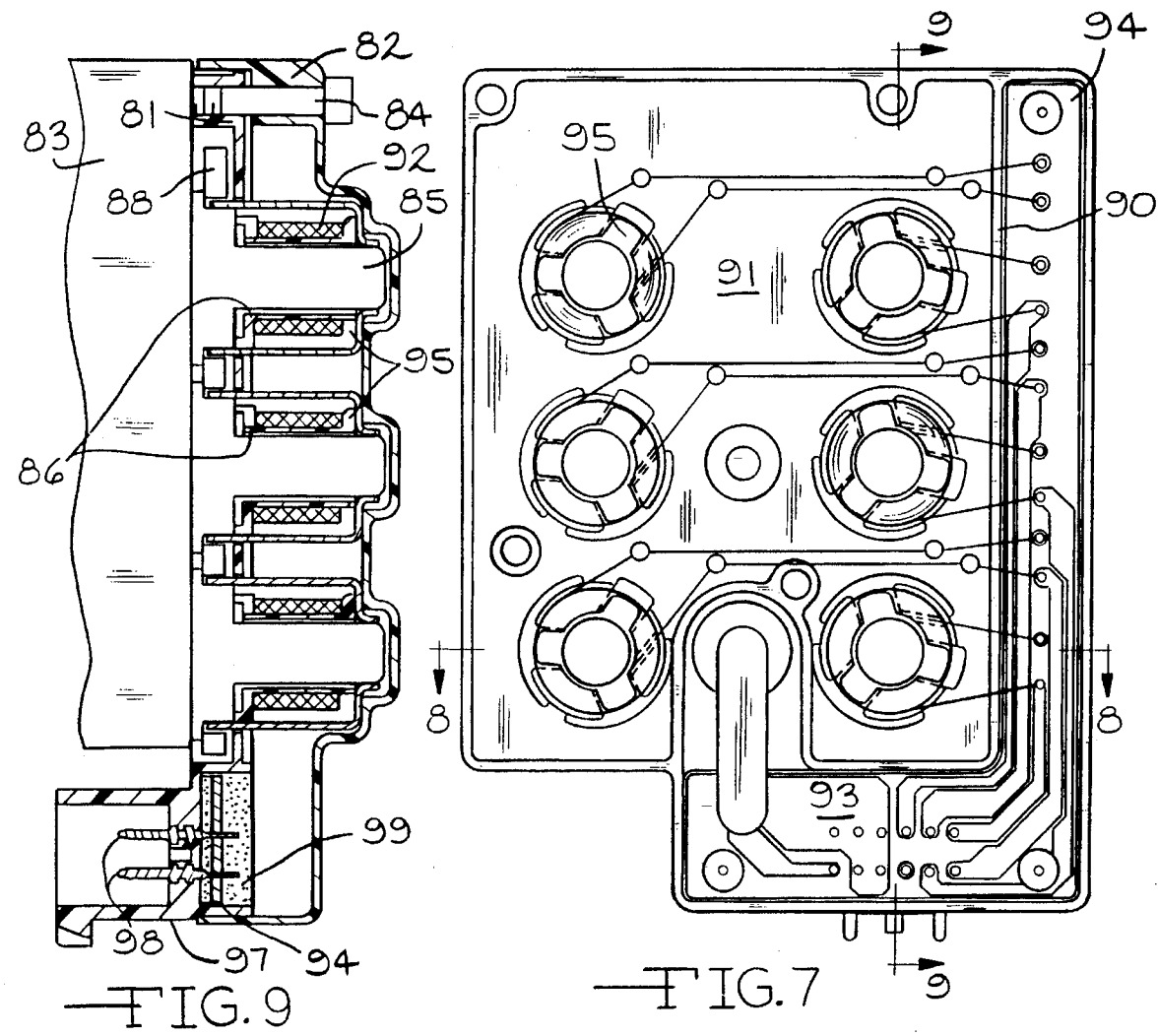
FIG. 9
FIG. 7
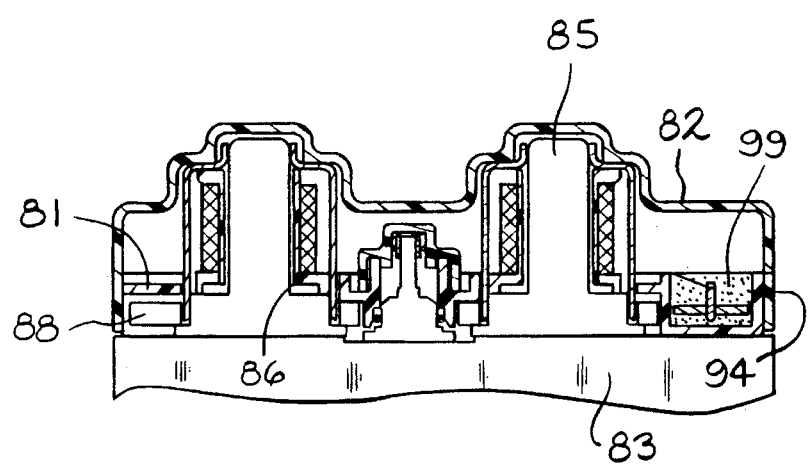
FIG. 8

ANTI-LOCK BRAKE CONTROL VALVE CONTROL MODULE

This is a continuation of Ser. No. 08/286,584, filed Aug. 5, 1994, abandoned, which is a continuation of application Ser. No. 50/999,420, filed Dec. 31, 1992, also abandoned.

BACKGROUND OF THE INVENTION

The present invention relates generally to a multiple solenoid-actuated control valve for a vehicle anti-lock brake system and, in particular, to a removable module attached to the valve which includes solenoid coils for actuating the valve.

Anti-lock brake systems are becoming increasingly popular with vehicle operators. Such systems provide precise control of brake applications under adverse operating conditions such as rain, snow or ice and during panic stops. An anti-lock brake system typically includes a control valve which is incorporated in the brake hydraulic circuit for modulating the hydraulic pressure applied to the brake cylinders. Anti-lock brake systems further include an electronic controller which actuates the solenoid valves. The electronic controller is responsive to vehicle operating parameter signals from various sensors located on the vehicle.

The control valve has a plurality of solenoid activated valves which control the hydraulic pressure applied to the individual brake cylinders. Typically, the solenoid valves are installed as a unit, with each solenoid valve armature, coil and electrical connector assembled therein. One example of a prior art control valve wherein the solenoid coils are separable from the valve armatures is illustrated in FIG. 1 at 10. The control valve 10 has a valve body 11 which is connected to other hydraulic components of the anti-lock brake system (not shown) to form a hydraulic circuit. An example of an anti-lock brake system which can utilize the valve body shown in FIG. 1 is described in U.S. Pat. No. 4,865,399. The valve body 11 includes a plurality of solenoid actuated valves (not shown) for controlling the flow of brake fluid within the anti-lock brake system. The control valve 10 has both solid and hollow armature solenoid valves. The hollow armatures include axial passages for the flow of brake fluid. Depending upon the type of armature, the solenoid valves have closed end armature casings 12 or open end armature casings 13 extending from the valve body. As will be explained below, the open end armature casings 13 allow flow of hydraulic fluid through the hollow armatures.

The solenoid valves are actuated by solenoid coils 14 disposed about the extended armatures 12 and 13. Each coil 14 has a pair of lead wires (not shown). The individual coils 14 are covered by metal coil casings 15 which complete the magnetic circuit for the solenoid. The coils 14 and coil casings 15 are mounted upon a plastic lead frame 16. The lead frame 16 is attached to an end of the valve body 11 by a plurality of manifolds 17 which are secured to the valve body 11 by threaded fasteners 18. The manifolds 17 have internal passages to return the brake fluid passing through the hollow armatures and open end armature casings 13 to the valve body 11. The control valve 10 has a first resilient gasket 19 forming a seal between the lead frame 16 and the valve body 11.

The lead frame 16 is molded about a printed circuit board (not shown) to which the coil lead wires are electrically connected. The printed circuit board connects the coil leads to individual pins 20 carried by a multi-pin connector 21 formed on the lead frame 16.

The control valve 10 includes a second resilient gasket 22 covering the top of the lead frame 16. The second resilient gasket 22 has a plurality of apertures 23 formed therethrough which receive the pins 20 of the multipin connector 21. A cover 24 is attached to the valve body 11 by extended threaded fasteners 25. The cover 24 houses a circuit board (not shown) which carries the female element of the multipin connector (not shown). The female element receives the pins 20 of the multi-pin connector 21. The circuit board housed by the cover 24 typically includes electronic circuitry for controlling (not shown) the anti-lock brake system. The cover 24 also carries an external electrical connector 26 for connecting the control valve 10 to other electrical components (not shown) of the anti-lock brake system. Thus, the second gasket 22 provides a seal to protect sensitive electrical components from leaking brake fluid and other contaminants present in the surrounding environment.

For the prior art valve shown in FIG. 1, the solenoid coils 14 could be contaminated by brake fluid leaking from the manifolds 17 since the manifolds 17 are located in the portion of the valve containing the coils 14. In addition, if the second gasket 22 does not form an adequate seal, leaking brake fluid could reach the electronics located between the coil lead wires and the external connector 26. An improperly sealed gasket could allow contamination of the electronics by the outside environment.

Servicing the solenoid coils 14 requires removal of the lead frame 16. Removal of the lead frame 16 requires opening the hydraulic circuit since the manifolds 17 must be removed first. Invariably, opening the hydraulic circuit introduces air into the hydraulic lines which must be bled upon reassembly. Furthermore, the multi-pin connector 21 must be disconnected for removal of the lead frame 16. System reliability is adversely affected if a good electrical connection is not made upon reassembly of the multi-pin connector 21. Thus, inclusion of the solenoid coils 14 within the valve body 11 is complex, requiring many parts.

SUMMARY OF THE INVENTION

This invention relates to an improved control valve having a removable coil support module which enables the entire module, including the solenoid coils, to be removed from the valve body without removing the valve body from the vehicle, and without affecting the integrity of the hydraulics. In particular, the module carries a plurality of solenoid coils for actuating the various valves, and an external connector for electrically connecting the module to the other electrical components of the brake system. All the solenoid coils are carried by the module. The individual coils are wound over cores having hollow centers. Each coil has a pair of lead wires which are electrically connected to the external connector. The module further carries metal coil casings which cover each coil to complete the magnetic circuit for the respective solenoid valve.

The coil support module is attached to a valve body which includes a plurality of solenoid valves. Typically, the control valve is included in the brake system between the master cylinder and the brake cylinders being controlled. All solenoid valve hydraulic passages are contained within the valve body and all external control valve hydraulic connections are made directly to the valve body. Thus, the valve body is combined with the remainder of the brake system hydraulic components to form a hydraulic circuit. The individual solenoid valves have armatures extending from the valve body. The armatures are enclosed by cylindrical armature casings.

When the coil support module is attached to the valve body, the armature casings are received by the hollow coil cores. Thus, the coils are disposed about the armature casings. When a coil is energized, the corresponding armature is shifted within the armature casing to actuate the valve.

The valve body is designed such that all of the solenoid valve armature casings are of the closed end type. Thus, external manifolds are not required to complete the hydraulic circuit. Therefore, the coil support module can be removed for servicing without opening the brake hydraulic circuit. Because of this, brake fluid is not lost when the electrical components must be serviced. Also, it is not necessary to bleed the brakes following servicing. Furthermore, the armature casings seal the armatures, protecting the coils from hydraulic brake fluid in the unlikely event that a leak should develop in a valve.

In addition to having a construction which enhances serviceability of the anti-lock brake system, the coil support module has a construction which maximizes protection for associated connecting and electronic components carried by the module. In particular, all connections and electronics located between the solenoid coil lead wires and the external module electrical connector are located in an area completely sealed from the environment and any possible brake fluid leakage.

More specifically, the coil support module is divided into a first portion which carries the solenoid coils and a second portion which carries the external electrical connector and any electronics that are included in the control valve. The lead wires for each coil extend into the second portion of the coil support module where they are typically secured and electrically connected to a printed circuit board. The individual pins of the external connector are also connected to the printed circuit board. Thus, a continuous path is formed from the solenoid coils to the external connector pins which is contained within the coil support module. In alternate embodiments described below, the printed circuit board carries additional electronic components.

A resilient self-curing sealing material applied to the second portion of the coil support module forms a seal to protect the electrical components from environmental contamination. For one embodiment of the invention, the sealing material is applied directly over the printed circuit board and connecting wires. An alternate embodiment of the coil support module includes a cover over the second portion. For this embodiment, a channel is formed around the perimeter of the second portion which receives a depending edge formed on the bottom of the cover. The sealing material is then disposed into the channel to form a seal between the cover and the second portion of the coil support module. Thus, the cover and the second portion define a sealed enclosure which contains the electrical connections.

Another embodiment of the control valve includes power transistors in the second sealed portion which amplify control signals to drive the solenoid coils. The anti-lock brake system control electronics can also be included in the sealed portion of the module. When this is done, the amount of external wiring needed for the systems is reduced. Further, the electronics are readily removable for servicing. To reduce servicing time, a rebuilt module can be substituted for a faulty one. The faulty module could then be sent to a central location for servicing.

The coil support module construction can also result in winding the solenoid coils directly on the module. The direct winding of the coils reduces manufacturing time and cost. Direct winding is applicable when the second portion of the coil support module is located along a side of the module. The coils are wound on cores extending from the module. The cores are either formed separately and mounted upon the module or formed directly as part of the module. The coils can be wound from a single continuous strand of wire to further reduce manufacturing time.

The winding method uses tooling pins mounted on a coil winding platten to separate lengths of the wire strand between the coils. The platten is positioned adjacent to the second portion of the coil support module. A wire strand is led past a tooling pin on the platten and attached to a connecting pin carried by the second portion of the coil support module. The wire is then extended into the first portion of the coil support module to a first coil core and wound around the core to form a coil. The wire is returned to the second portion and attached to a second connector. The wire is guided around a pair of platten tooling pins and into alignment for winding a second coil. The process is repeated until all the coils are wound. The wire strand is then electrically attached to the connectors. Finally, the pieces of the strand between the connectors are removed leaving a pair of wire leads for each coil extending from the coil to the connectors located in the second portion of the coil support module.

Various objects and advantages of this invention will become apparent to those skilled in the art from the following detailed description of the preferred embodiment when read in light of the accompanying drawings.

BRIEF DESCRIPTION OF THE DRAWINGS

FIG. 7 is a top plan view of the control valve illustrated in FIG. 6 with the cover removed.

FIG. 8 is a partial sectional elevational view taken along line 8—8 of FIG. 7.

FIG. 9 is a partial sectional elevational view taken along line 9—9 of FIG. 7.

DETAILED DESCRIPTION OF THE PREFERRED EMBODIMENT

Figure 1A:
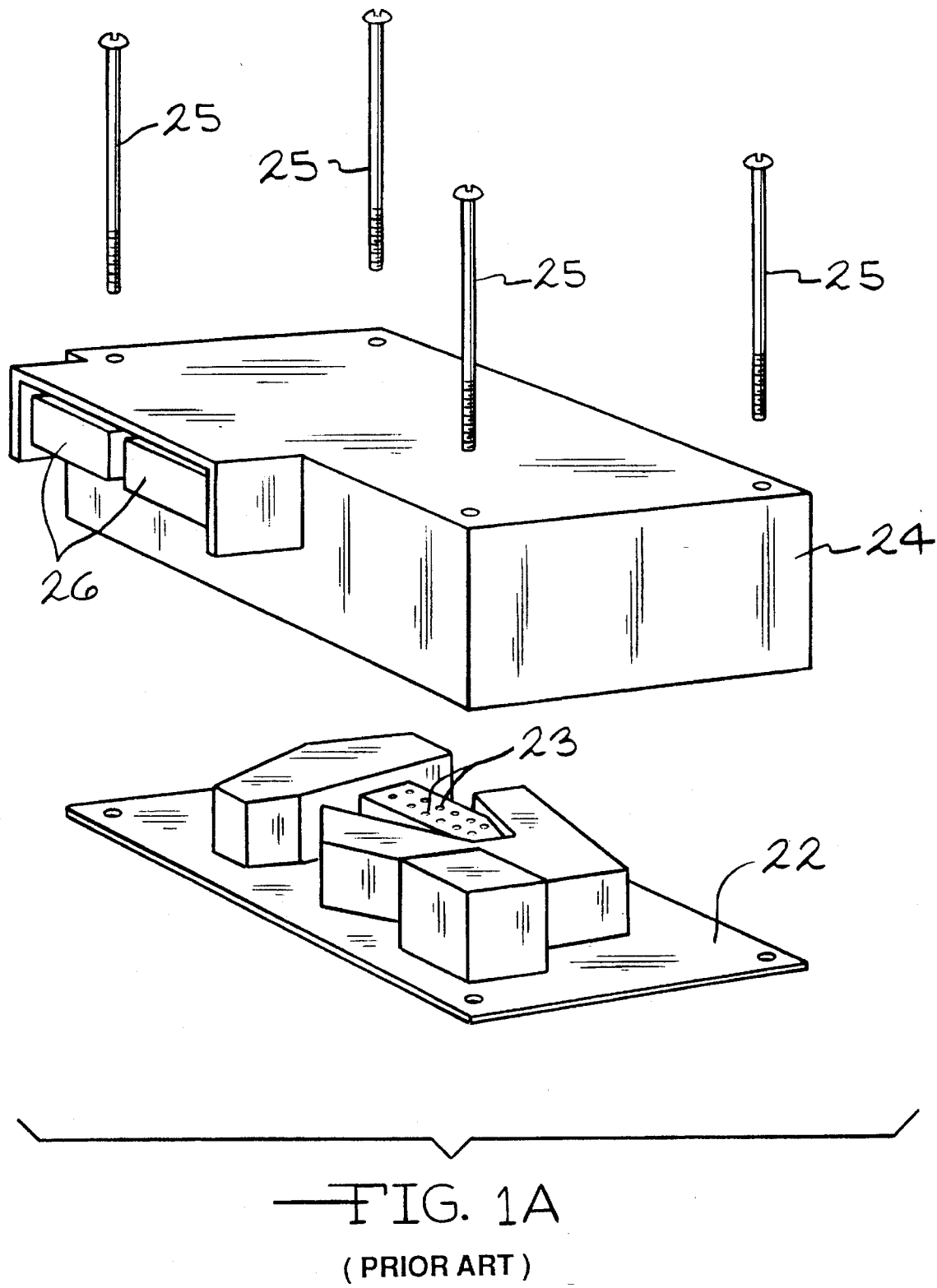
FIGS. 1A and 1B are an exploded perspective view of a prior art control valve.
Figure 1B:
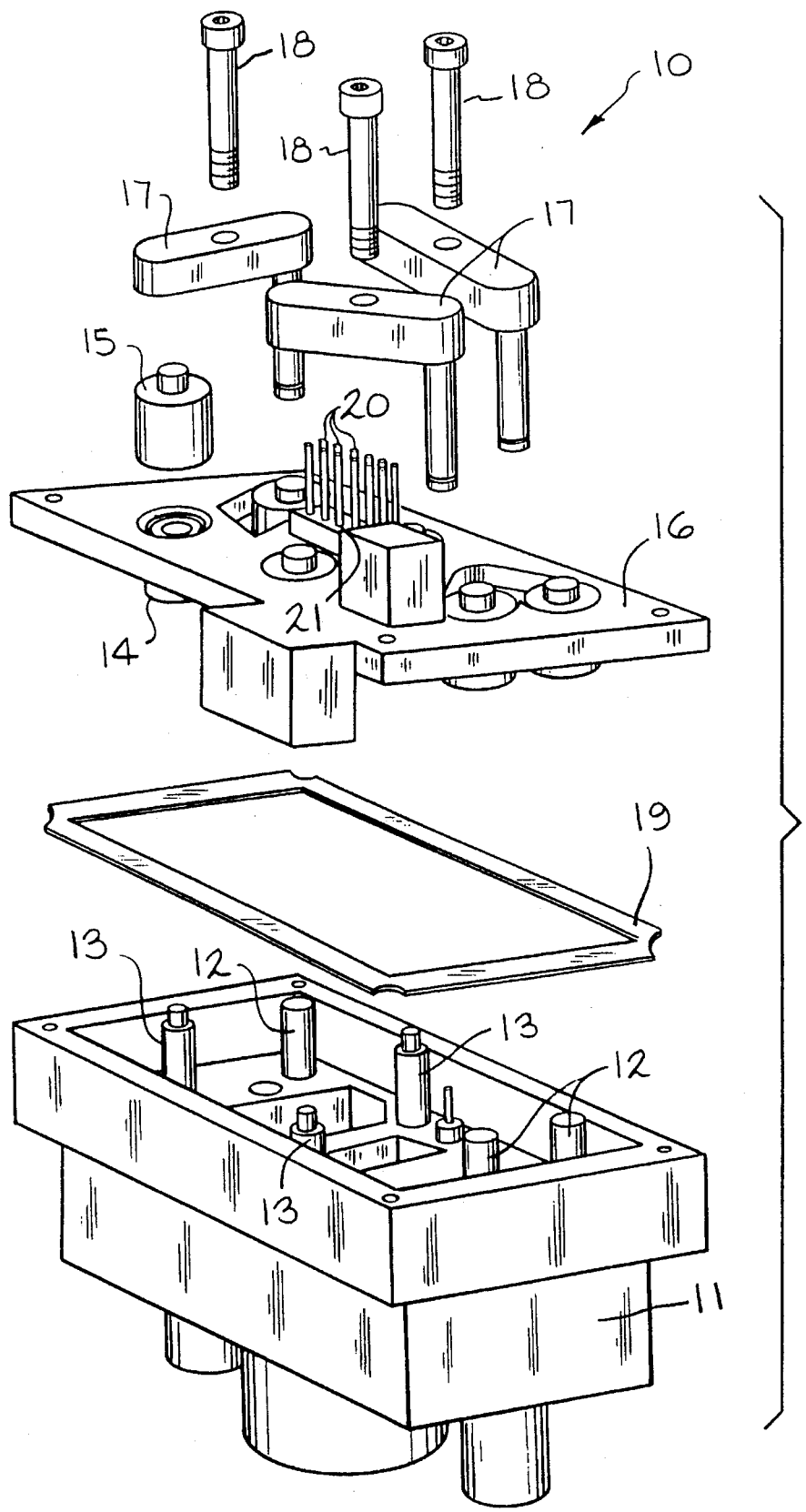
Figure 2:
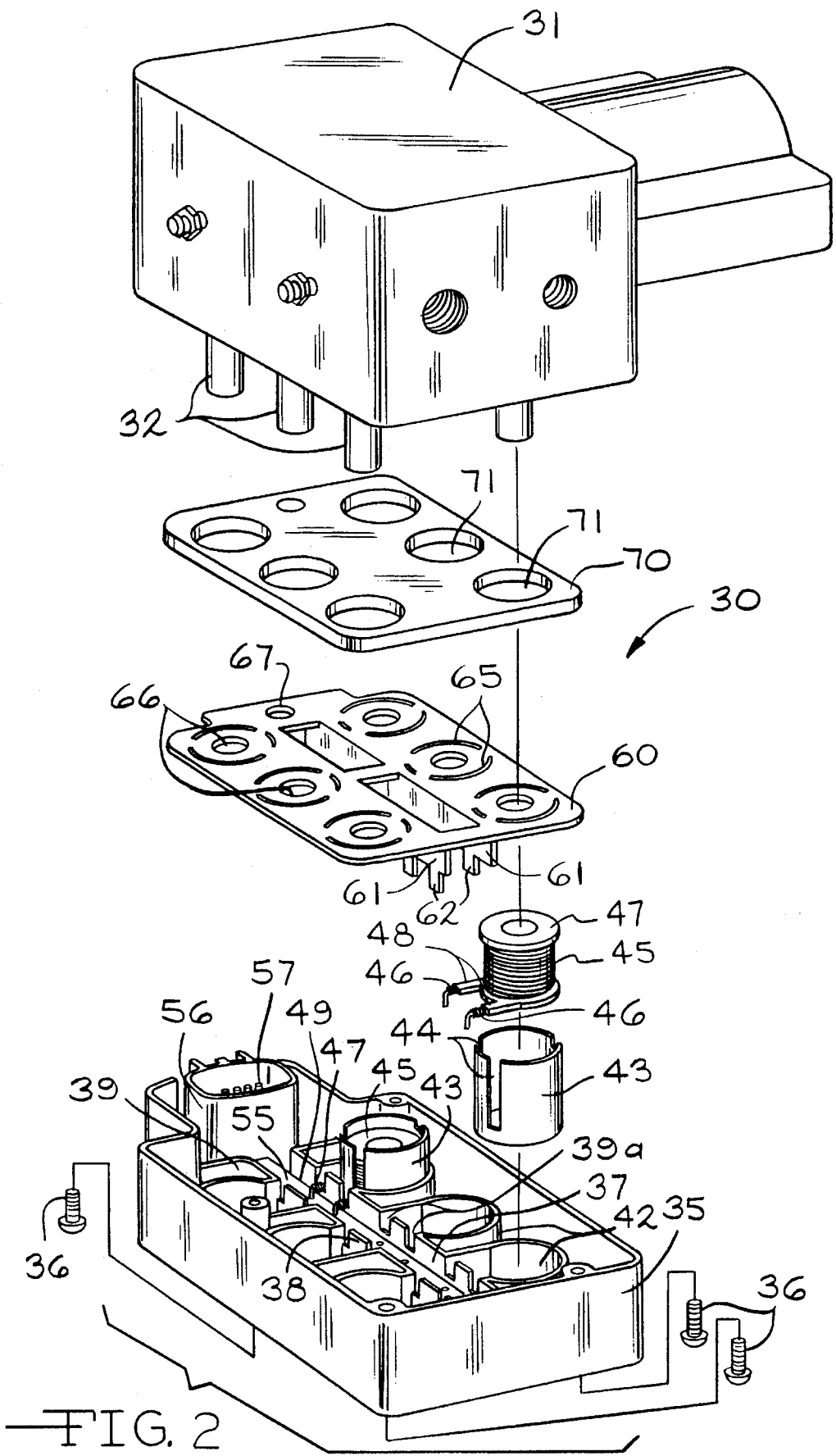
FIG. 2 is an exploded perspective view of a control valve in accordance with this invention.

Referring now to the drawings, there is illustrated in FIGS. 2–7 a control valve 30 in accordance with this invention. As best shown in FIG. 2, the control valve 30 has a valve body 31 which is connected to other hydraulic components of the anti-lock brake system (not shown). The valve body includes a plurality of solenoid actuated valves (not shown). The solenoid valves have hollow cylindrical armature casings 32 extending from the valve body 31. The casings 32 are provided with a closed outer end to contain brake fluid in the valve body. All control valve hydraulic passages are contained within the valve body 31 such that the manifolds 17 of the prior art valve 10 of FIG. 1 are not needed.

Figure 3:
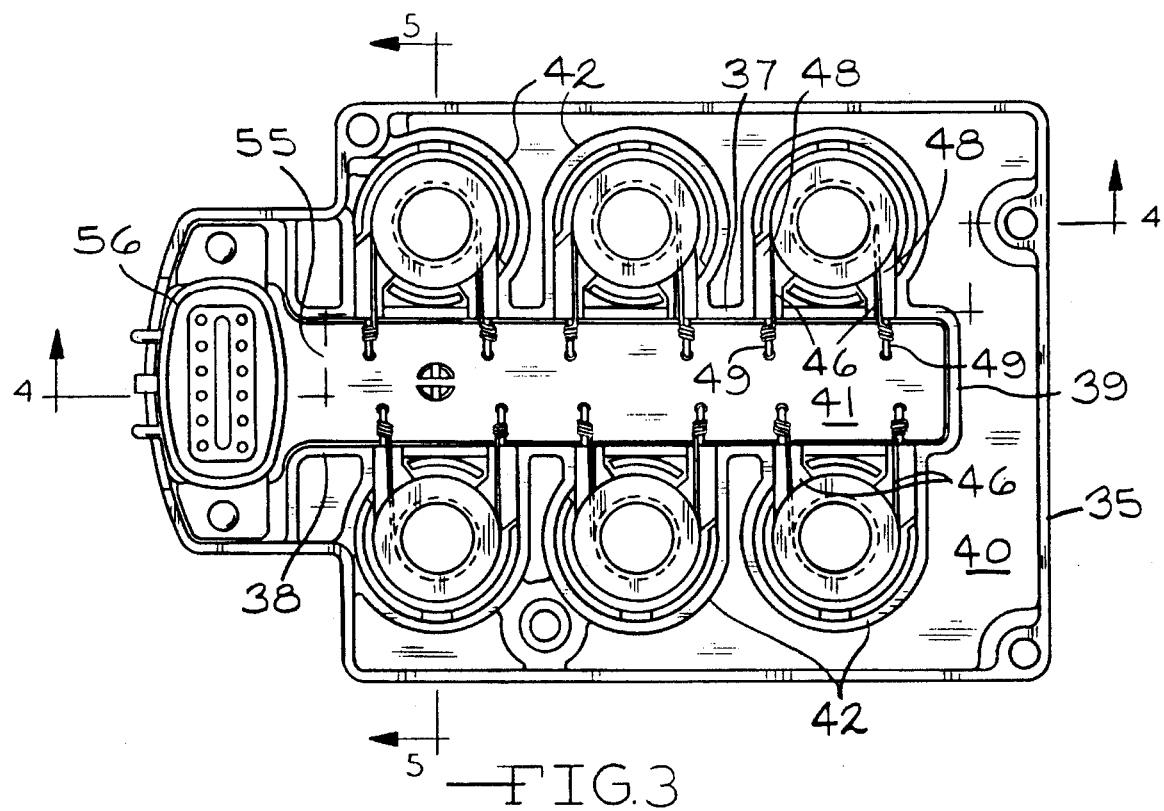
FIG. 3 is a top plan view of the control valve illustrated in FIG. 2 with the spacer plate and potting dam removed.

The control valve 30 further includes a coil support module 35 secured to the control valve body 31 by a plurality of threaded fasteners 36. The coil support module 35 can be formed from a glass reinforced plastic or other suitable material and includes spaced apart upstanding walls 37 and 38 which define an internal partition 39. As best seen in FIG. 3, the partition 39 divides the coil support module 35 into a first U-shaped portion 40 and a second T-shaped portion 41. The partition 39 includes a plurality of cross channels 39a formed therethrough, the purpose for which will be explained below. A plurality of coil retaining partitions 42 are formed in the first portion 40 of the coil support module 35. The coil retaining partitions 42 receive metal solenoid coil casings 43. For clarity, only two casings 43 are shown in FIG. 2. The coil casings 43 complete the path for the solenoid magnetic field. Each coil casing 43 includes a pair of vertical slots 44 the use of which will be explained below. The casings 43 receive solenoid coils 45 having lead wires 46 extending therefrom. The coils 45 are wound upon cores 47. Again, for clarity, only two coils 45 are shown in FIG. 2.

For the embodiment shown, each coil core 47 has a pair of molded square terminal inserts 48. Each terminal insert 48 includes an imbedded terminal lead pin 49. Each coil lead wire 46 is secured to a corresponding terminal insert 48 and attached to the terminal lead pin 49. When a coil 45 is placed into a coil casing 43, the terminal inserts 48 of the coil 45 are received by the coil casing slots 44. When the solenoid coils 45 and casings 43 are inserted into the coil support module 35, a terminal insert 48 is disposed within each cross channel 39a. Thus, as best seen in FIG. 3, the terminal insert 48 carries a coil lead wire 46 from the first portion 40 of the coil tray into the second portion 41.

The coil support module 35 includes an electrical coupling means 55 disposed within the second portion 41. For the embodiment shown, the coupling means 55 is a printed circuit board. As shown in FIG. 3, the terminal lead pins 49 are secured to the coupling means 55 providing a permanent electrical connection between the coils 45 and the coupling means 55. The second portion 41 of the coil support module 35 also carries an electrical connector 56 having a plurality of pins 57 for electrically connecting the control valve 30 to other electrical components of the anti-lock brake system. The connector pins 57 are secured to the coupling means 55. The printed circuit board connects the connector pins 57 to the terminal lead pins 49 providing a permanent continuous electrical connection between the connector pins 57 and the solenoid coils 45.

The present invention could also be embodied without the terminal inserts 48 or lead pins 49. In such an embodiment, the individual coil lead wires 46 are extended through the cross channels 39a and secured directly to the coupling means 55 and electrically connected thereto.

The coil support module 35 further includes a potting dam 60 which is disposed over the solenoid coils 45. The potting dam 60 includes vertical depending partitions 61 having fingers 62 which extend into the cross channels 39a formed through the coil support module partition 39. The fingers 62 cover the terminal inserts 48 and the coil lead wires 46 and physically block the remainder of the cross channels 39a.

The potting dam 60 also has a plurality of arcuate slits 65 formed therethrough. The slits 65 receive the top edge of the coil casings 43 allowing contact between the valve body 31 and the coil casings 43 to complete a magnetic circuit. The potting dam 60 further includes a plurality of apertures 66 formed therethrough which receive the valve armature casings 32 that extend from the valve body 31. A small aperture 67 formed through the potting dam 60 receives a reset switch contact 64 as shown in FIG. 5.

Figure 4:
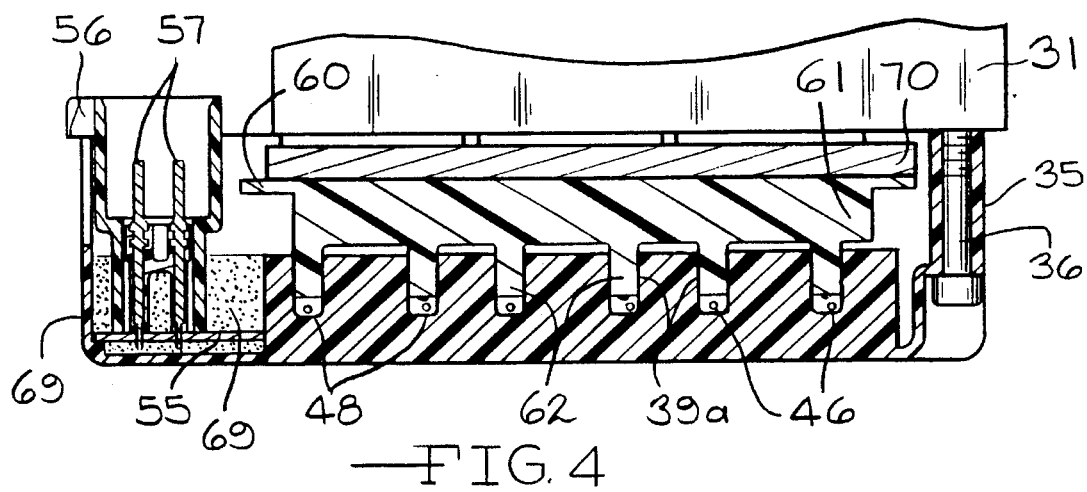
FIG. 4 is a partial sectional elevational view taken along line 4—4 of FIG. 3.
Figure 5:
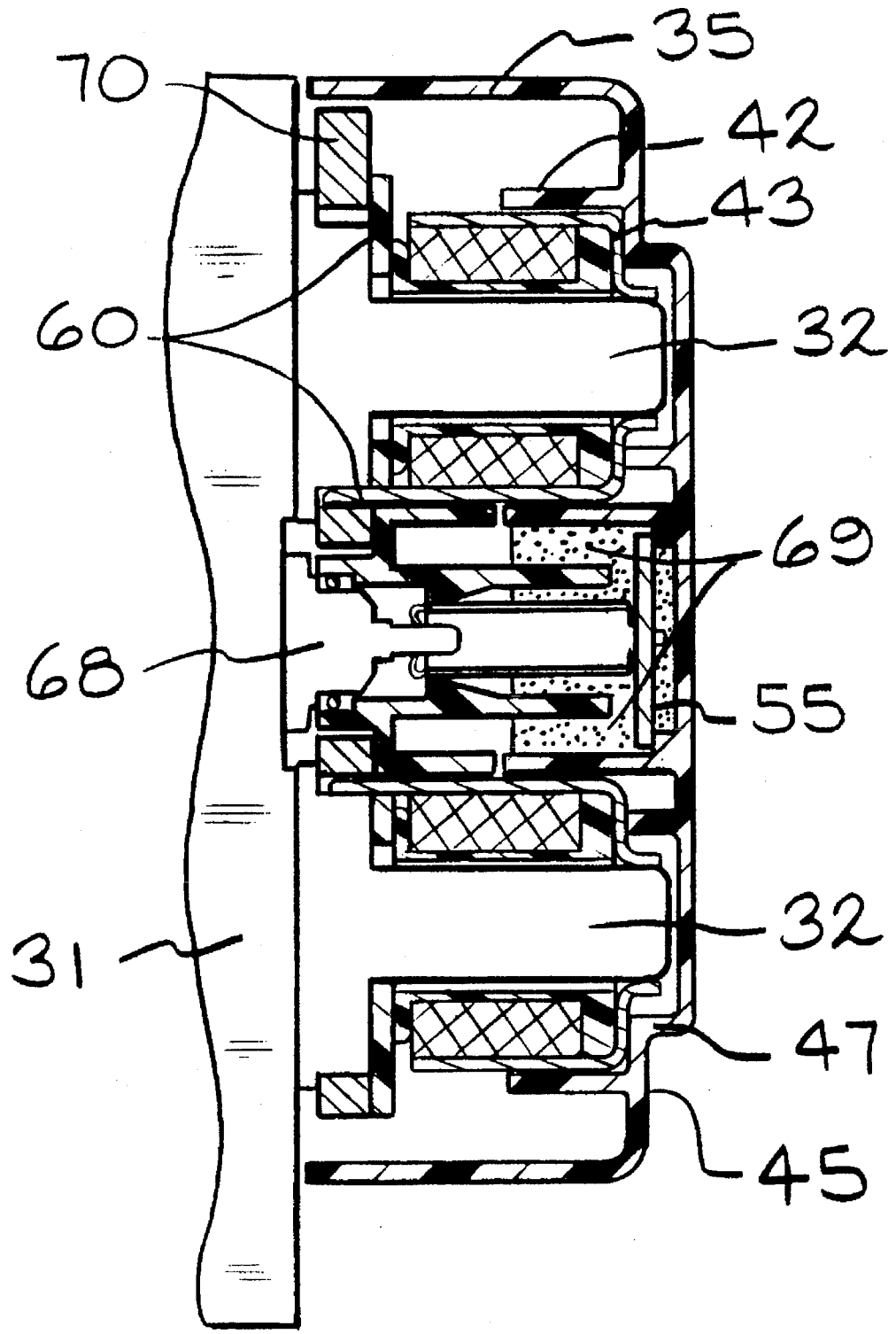
FIG. 5 is a partial sectional elevational view taken along line 5—5 of FIG. 3.

Once the potting dam 60 has been positioned, a resilient self curing potting material 69 is disposed within the second portion 41, as best seen in FIGS. 4 and 5. The potting dam partitions 61 and fingers 62 contain the potting material 69 within the second portion 41. The material 69 covers the electrical coupling means 55, sealing both the electrical coupling means 55 and the electrical connections to protect them from contamination by the outside environment. Further, in the unlikely event of a hydraulic fluid leak from one of the solenoid valves, the potting material 69 will prevent the hydraulic fluid from contacting the electrical coupling means 55 or any of the connections thereto.

The coil support module 35 further includes a plastic spacer plate 70 disposed between the potting dam 60 and the valve body 31 to assure proper positioning of the coil support module 35 with respect to the valve body 31. The spacer plate 70 has a plurality of apertures 71 formed therethrough which receive the valve armature casings 32 and the reset switch contact 68.

Figure 11:
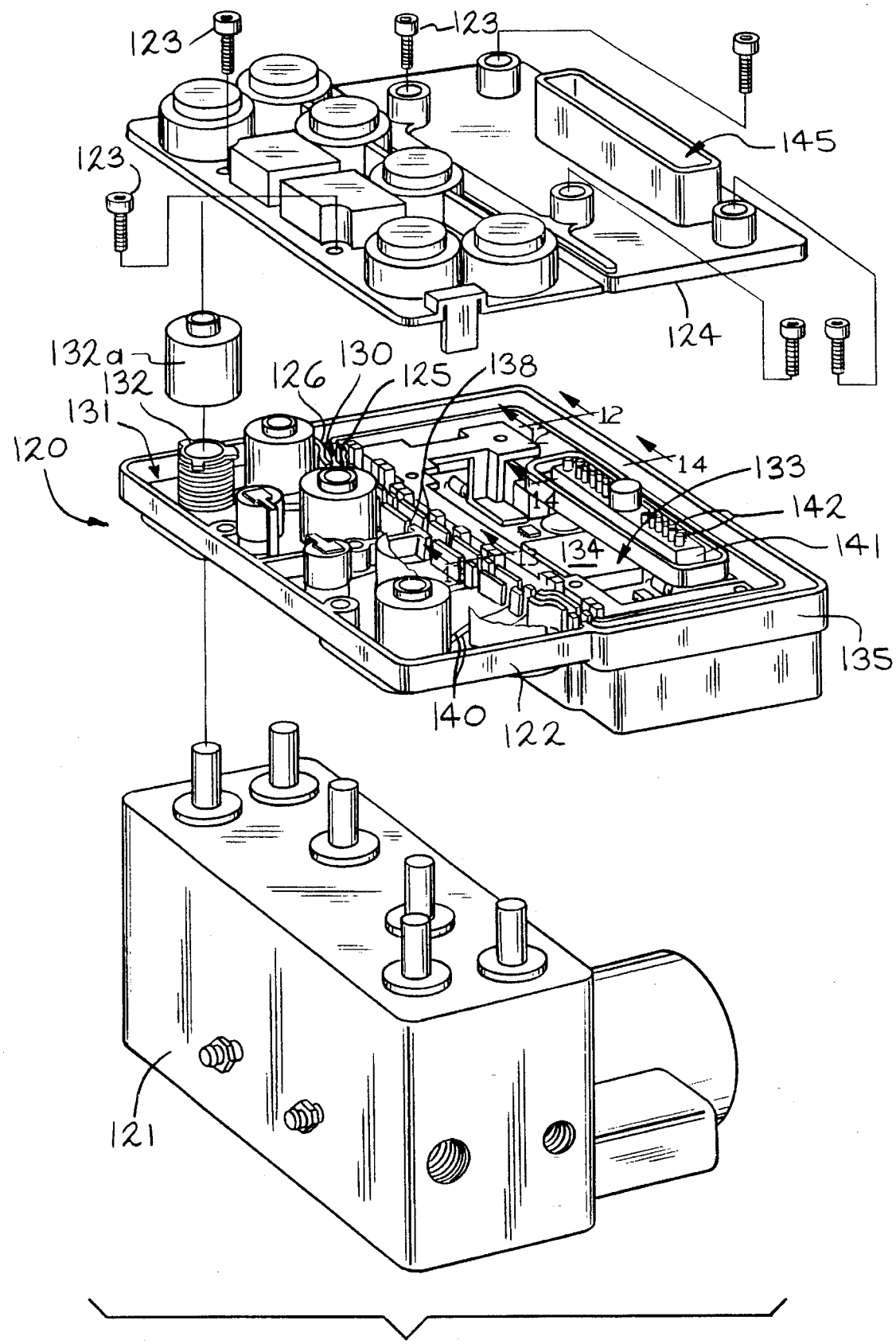
FIG. 11 is an exploded perspective view of a third embodiment of a control valve in accordance with this invention which includes an alternative sealing structure.

As shown in FIG. 11, the coil support module 35 has a solid bottom which protects the internal components. Therefore, a cover is not needed.

While a printed circuit board is used above, additional electrical components can be included in the electrical coupling means 55. For example, power transistors for amplifying control signals to a level sufficient for driving the solenoid coils 45 can be mounted on the coupling means 55. When this is done, adequate heat sinks would be provided to dissipate heat generated by the power transistors. The second portion 41 of the coil support module can further include electronic control circuitry for the anti-lock brake system. Location of the control circuitry in the coil support module 35 would reduce the amount of wiring required for the anti-lock brake system.

Use of the control valve 30 will now be described. The valve body 31 and the coil support module 35 can be completely assembled separately. The coil support module 35 is then attached to the valve body 31 with the coils 45 surrounding the extended armature casings 32. The complete control valve 30 is attached to a vehicle. The vehicle brake system hydraulic lines are attached to the valve body 31 and the brakes lines bled to remove any air pockets. The electrical components are connected to the control valve by attaching the female half (not shown) of the multi-pin connector 56. The control valve 30 is then ready for use. Should any of the electrical components require servicing, the coil support module 35 can be easily detached from the valve body 31 by disconnecting the external connector 56 and removing the threaded fasteners 36. Removal of the coil support module 35 will not open any hydraulic brake lines, since the hydraulic circuit is totally separate from the coil support module 35.

Figure 6:
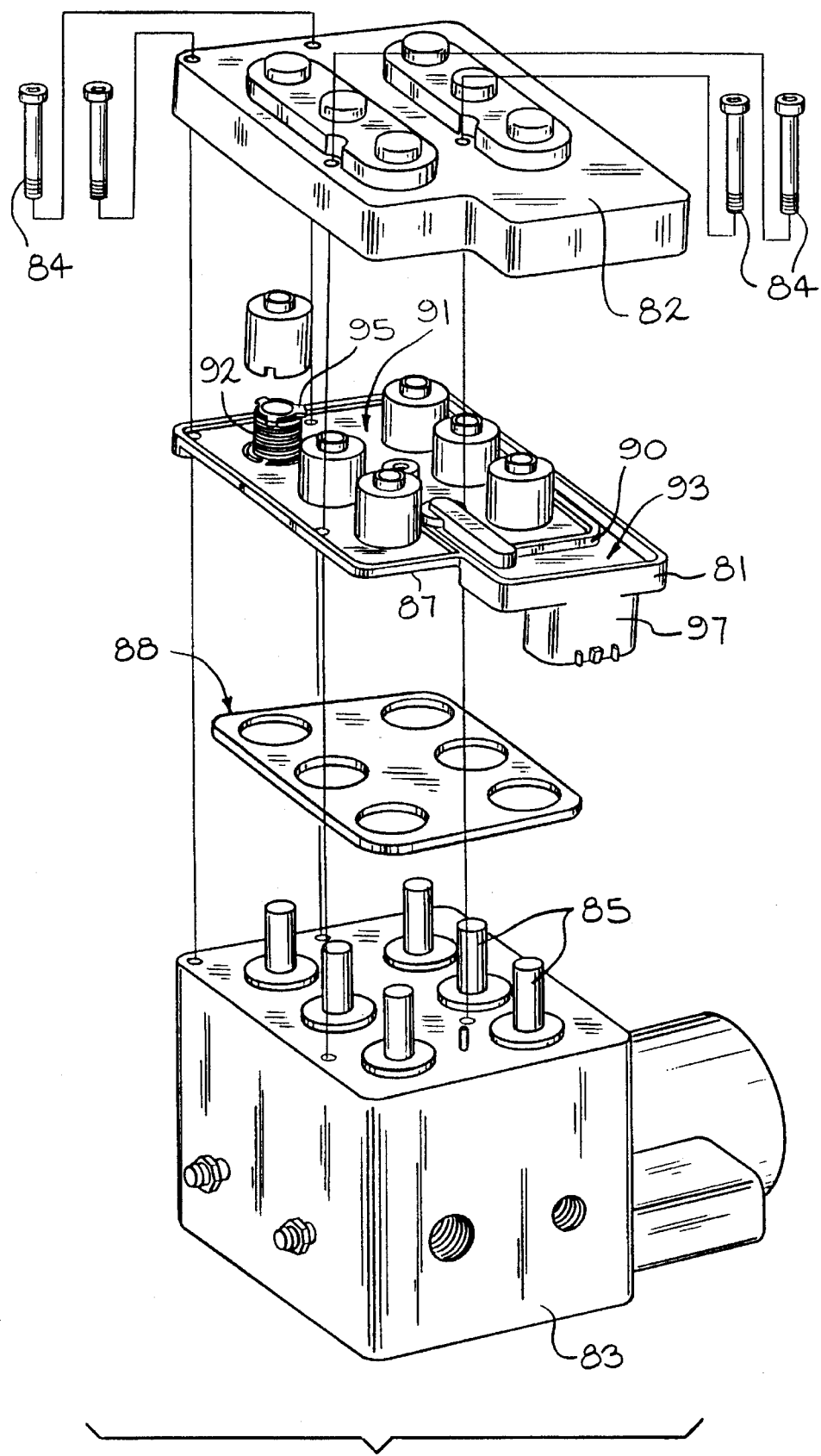
FIG. 6 is an exploded perspective view of a second embodiment of a control valve in accordance with this invention which has a separable cover.

An alternate embodiment of the invention is shown in FIGS. 6–10 at 81. This embodiment differs from the previously described one in that the coil support module 81 is inverted. Also, as will explained below, it is possible to wind the coils directly upon the coil support module. As shown in FIG. 6, the inverted coil support module 81 exposes the internal components to the environment. Therefore, the module 81 includes a removable cover element 82 for protecting the internal components. Both the coil support module 81 and the cover 82 can be formed from a glass reinforced plastic or other suitable material.

The coil support module 81 and the cover 82 are secured to a valve body 83 by a plurality of threaded fasteners 84. As in the previous embodiment, the valve body 83 includes a plurality of valve armature casings 85 extending therefrom. As best seen in FIGS. 8 and 9, the valve armature casings 85 are received by apertures 86 formed through the bottom 87 of the coil support module 81. A plastic spacer plate 88 is disposed between the coil support module 81 and the valve body 83 to assure proper positioning of the coil support module. The spacer plate 88 includes apertures 89 which receive the valve armature casings 85.

As best seen in FIG. 7, the coil support module 81 includes a partition 90 which divides the module 81 into a first portion 91, which carries a plurality of solenoid coils 92, and a second portion 93, which carries an electrical coupling means 94. For the embodiment illustrated, the coupling means 94 is a printed circuit board.

The first portion 91 includes a plurality of coil cores 95 extending therefrom. The cores 95 can be formed separately from the coil support module 81 and attached thereto or formed integrally therewith. Because the cores 95 extend from the surface of the coil support module, they are accessible to a coil winding machine. Furthermore, the electrical coupling means is accessible by being disposed along an edge of the module 81. Therefore, as will be explained below, the coils 92 can be wound upon the cores 95 in place on the coil support module 81 from a continuous strand of wire 96. It is also possible to wind the coils 92 separate form the coil support module 81 and then mount the coils upon the module 81; however, winding coils directly on the module 81 is more efficient and less expensive.

The second portion of the module 81 carries a multi-pin connector 97. The connector 97 has a plurality of pins 98 for connecting the module 81 to the other electrical components of the anti-lock brake system (not shown). A resilent self curing sealing material 99 is disposed over the electrical coupling means 94 in the second portion 93 to protect the components and the connections from environmental contamination. As in the previously described embodiments, the electrical coupling means 94 can be structured to include power transistors and anti-lock brake system control circuitry.

Figure 10:
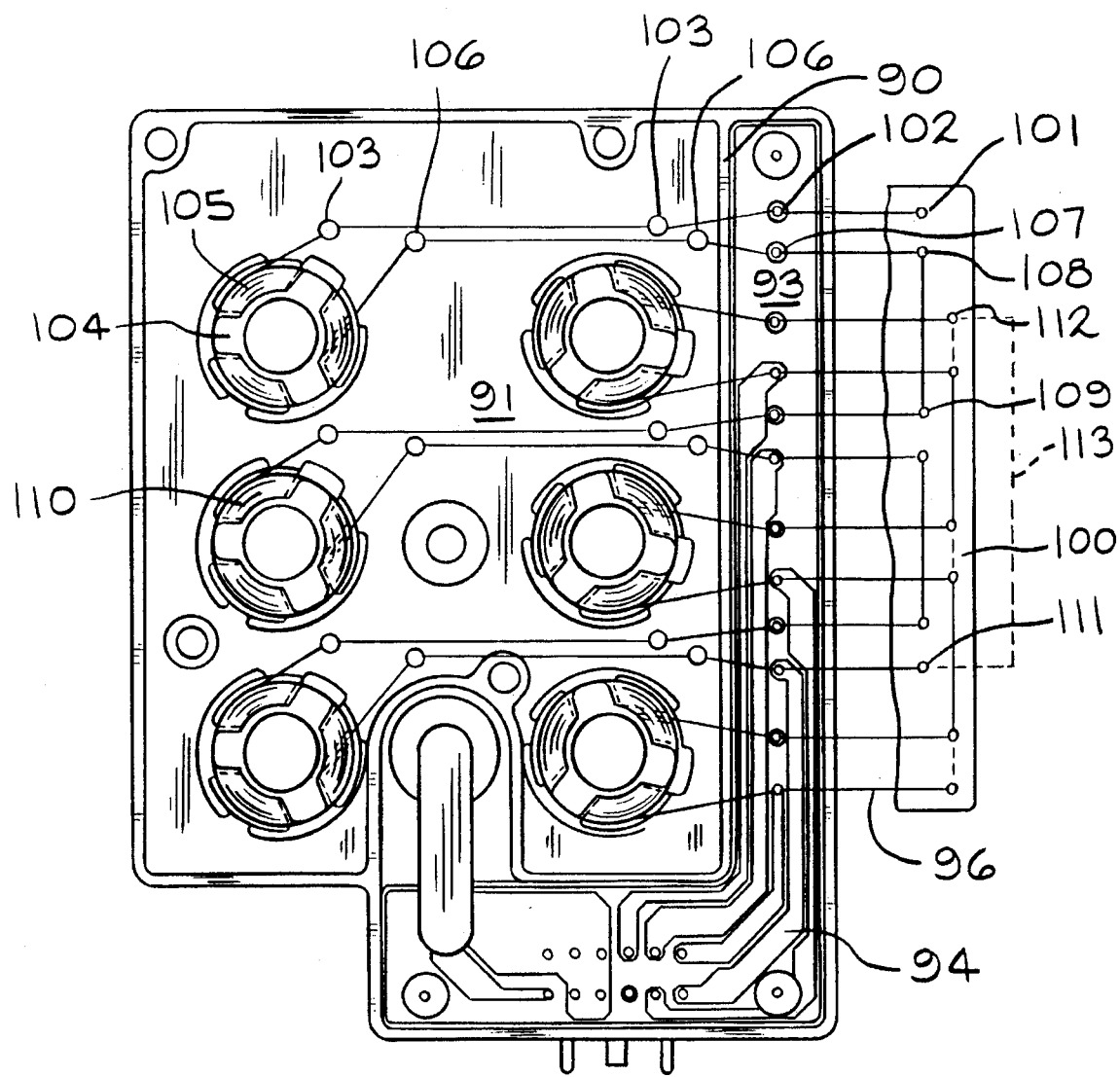
FIG. 10 is a top plan view of the control valve illustrated in FIG. 6 with the cover removed and showing the winding pattern for the solenoid coils.

The method of winding the coils 92 in place on the module 81 is illustrated in FIG. 10 and will now be explained. The module 81 is positioned adjacent to a coil winding machine (not shown). The coil winding machine includes a coil winding platten 100 having a plurality of tooling pins mounted thereon. The platten 100 is positioned next to the electrical coupling means 94, as shown in FIG. 10. Successive passes are made by the coil winding machine (not shown), beginning by winding the coils located furthest from the the machine and ending by winding the nearest coils. The wire strand 96 is guided by the winding platten tooling. The wire strand 96 is guided past a first platten tooling pin 101 into the second portion 93 of the coil support module and secured to a first coupling means pin 102. The wire 96 is then extended over the partition 90 into the first portion 91. The wire 96 is guided past a first pair of wire locator pins 103 which are formed in the first portion 91 of the coil support module 81 to the first coil core 104. The wire may be secured by looping around the locator pins 103 or stretched tightly thereby. The wire 96 is wound around the first core 104 to form the first solenoid coil 105. The wire 96 is then extended past a second pair of wire locator pins 106, over the partition 90 and secured to a second coupling means pin 107. The wire 96 is returned to a second platten tooling pin 108 and led to a fifth platten tooling pin 109 which corresponds to the second coil 110 located in the row of coils furthest from the coil winding machine. The coil winding process is repeated to form successive coils.

For the embodiment illustrated in FIG. 10, three coils are wound in the row farthest from the coil winding machine. After winding the last coil, the wire is brought back to the tenth platten pin 111. The near row of coils are then wound, beginning with the third platten pin 112. Depending upon the winding machine used, the wire 96 may be secured to the tenth platten pin 111, cut and then attached to the third platten pin 112 to resume winding. This is the method illustrated in FIG. 10 with the solid lines. It is also possible to wind all the coils from one continuous strand of wire, in which case the tenth and third platten tooling pins are connected by the wire strand 96, as shown by the dashed line 113 in FIG. 10.

Once all the coils are wound, the wire is electrically attached to the coupling means pins by soldering or other means. Then the portions of wire between the coupling means pins and the platten pins are removed, leaving a pair of lead wires for each of the coils.

A third embodiment of the control valve is shown at 120 in FIGS. 11–14. In this embodiment, sealing material is disposed in a channel which surrounds the perimeter of the second portion of the coil support module to form a sealed enclosure. The sealed enclosure contains electrical components of the anti-lock brake system. This enhances servicing by leaving the electrical components free of any sealing material.

The control valve 120 includes a valve body 121 having a coil support module 122 secured thereto by a plurality of threaded fasteners 123. The coil support module 122 includes a cover 124 for protecting the components carried by the module 122. The coil support module 122 further includes first and second spaced apart upstanding walls 125 and 126. The walls 125 and 126 define a channel 130 which divides the the module into a first portion 131 for carrying solenoid coils 132 and coil casings 132a and a second portion 133 for carrying an electrical coupling means 134. A portion of the coil casings and windings have been removed for two of the coils in FIG. 11 so that the upstanding walls 125 and 126 may be better seen. The ends of the second wall 126 join a side wall 135 of the second portion 133 of the coil support module 122. The side wall 135 cooperates with the first wall 125 to extend the channel 130 around the perimeter of the second portion 133.

The upstanding walls 125 and 126 further include cross channels 138 formed therethrough. The cross channels 138 receive lead wires 140 extending from the solenoid coils 132 into the second portion 133. The ends of the lead wires 140 are attached to the electrical coupling means 134. The second portion 133 further carries a multi-pin connector 141. The multi-pin connector 141 includes a plurality of connector pins 142 which are electrically connected to the electrical coupling means 134. The multi-pin connector 141 extends through an opening 145 formed in the module cover 124. The multi-pin connector 141 is connected to the other electrical components of the anti-lock brake system.

Figure 12:
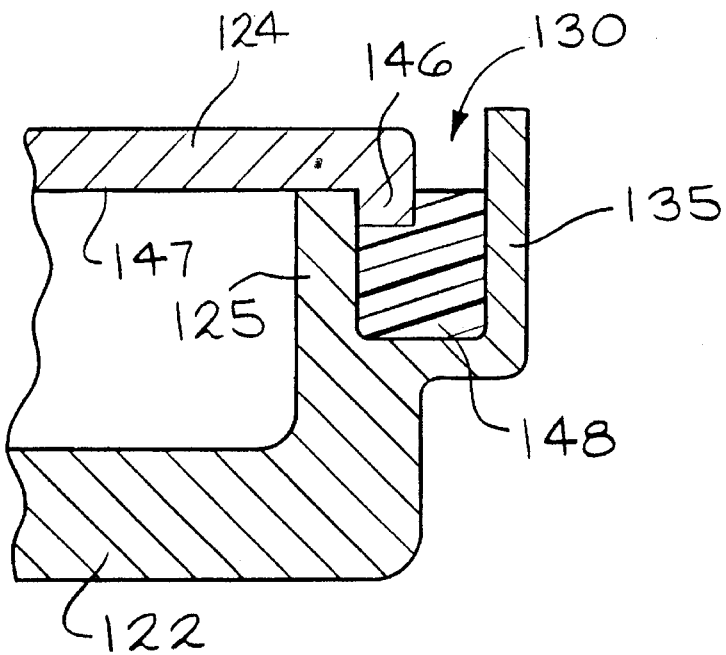
FIG. 12 is a partial sectional elevational view taken along line 12—12 of FIG. 11 which shows the cover sealing structure.

As shown in FIG. 12, the module cover 124 has a depending shoulder 146 formed about the perimeter of the bottom surface 147. The shoulder 146 is received by the channel 130. A resilent self curing sealing material 148 is disposed in the channel 130 before attaching the cover 124 to the coil support module 122. The cover shoulder 146 extends into the sealing material to form a seal between the cover and the second portion 133. The seal prevents contamination of electrical components carried by the second portion 133 of the coil support module 122.

Figure 13:
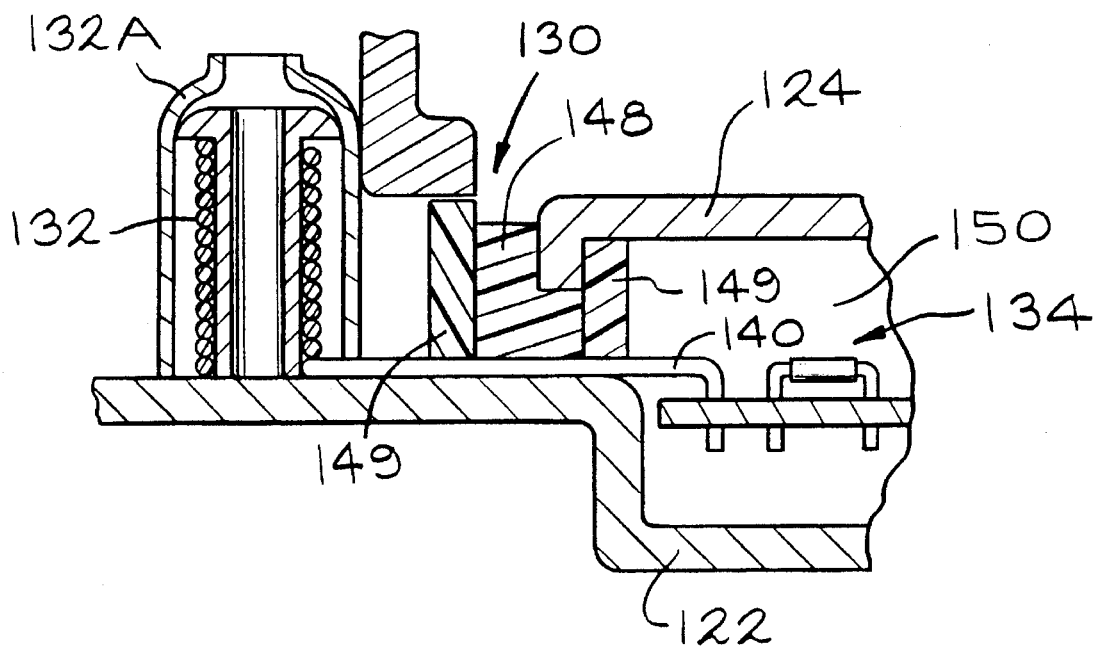
FIG. 13 is a partial sectional elevational view taken along line 13—13 of FIG. 11 which shows additional cover sealing structure.

FIG. 13 illustrates sealing of the cross channels 138. Should the uncured sealing material 148 be prone to migration, blocking elements 149 are inserted into the cross channels 138 as physical barriers to retain the sealing material 148 within the channel 130. Thus, the cover 124 cooperates with the channel 130 formed in the second portion 133 of the coil support module 122 to define a sealed enclosure 150.

Figure 14:
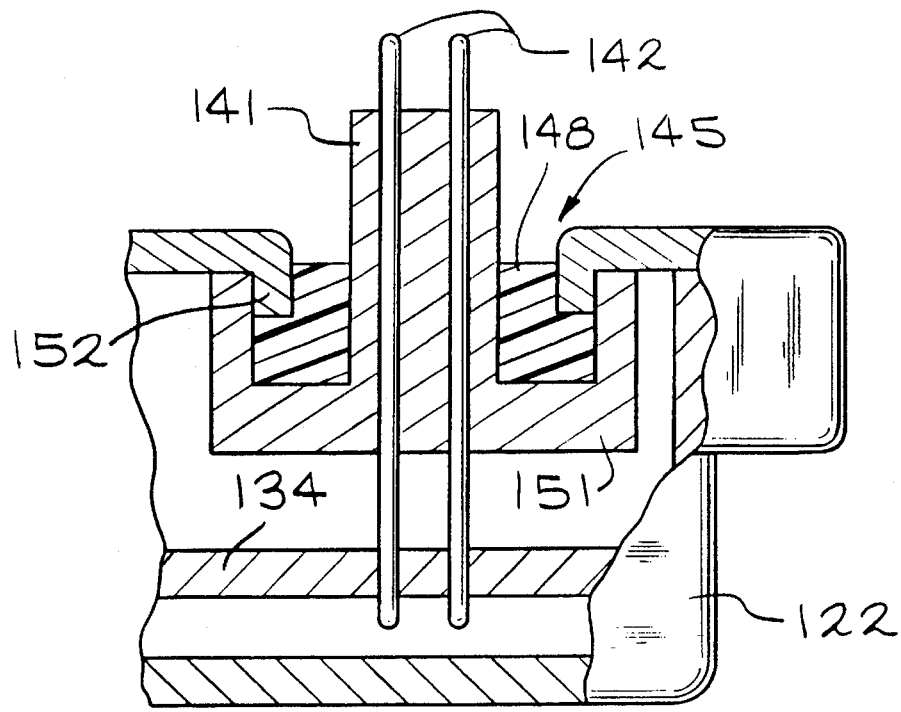
FIG. 14 is a partial sectional elevational view taken along line 14—14 of FIG. 11 which shows the sealing structure for the multi-pin connector.

FIG. 14 shows the sealing of the cover opening 145. The multi-pin connector 141 includes a U-shaped channel 151 formed around the perimeter of its base. The channel 151 receives a second depending shoulder 152 formed around the bottom of the opening 145. The resilent sealing material 148 is disposed in the space remaining in the channel 151 after the cover 124 is attached to the coil support module 122 to form a seal between the cover opening 145 and the multi-pin connector 141.

Figure 15:
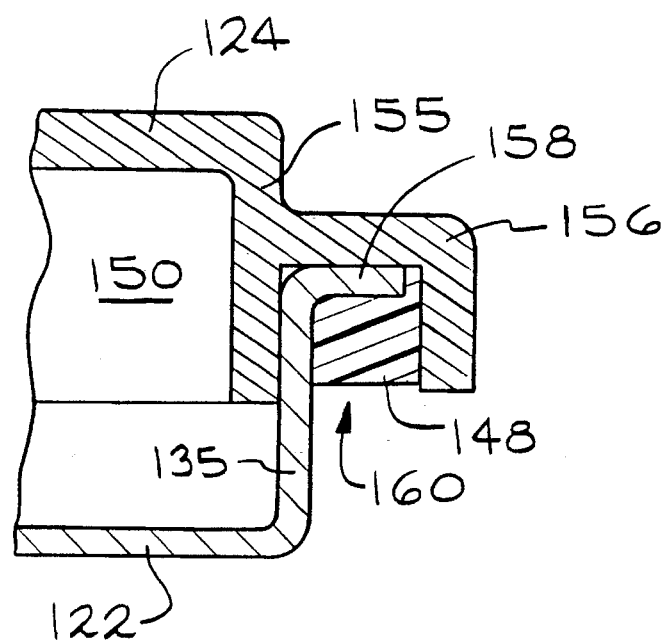
FIG. 15 is a partial sectional elevational view of the valve illustrated in FIG. 11 taken along line 12—12 which shows an alternate cover sealing structure.

An alternate structure for forming the seal between the cover 124 and the second portion of the coil support module 133 is illustrated in FIG. 15. In FIG. 15, the lower portion of the cover wall 155 is formed as an inverted U-shaped channel 156. The U-shaped channel 156 receives a flange 158 formed along the top edge of the second portion side wall 135. The resilent sealing material is disposed within the space 160 defined by the side wall and flange 158 and the U-shaped channel 156.

Different embodiments of the control valve 120 have different electrical connecting means 134 disposed within the sealed enclosure 150. For the embodiment shown in FIG. 11, the connecting means 134 carries the electronic control circuitry for the anti-lock brake system. Because the sealing material 148 is confined to the perimeter channels 130 and 151, the circuitry is not covered and thus can be serviced. In another embodiment, the connecting means 134 includes only a printed circuit board. The remainder of the anti-lock brake system electrical components would be located remote from the control valve 120. For a further embodiment, the connecting means 134 includes power transistors and heat sinks for amplifying the control signals to a level to drive the solenoid coils 132.

Thus, this invention provides an easily removable module for mounting solenoid coils and associated electrical components upon an anti-lock brake system control valve. Electrical parts sensitive to environmental contamination are located in a sealed portion of the module. The module is completely separate from the hydraulic circuit for the anti-lock brake system. Therefore, the module can be removed from the control valve for servicing without opening any hydraulic lines.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A control valve for a vehicle anti-lock brake system comprising:

a valve body including at least one solenoid operated valve having an armature extending from said valve body;

a coil support module removeably attached to said valve body, said module including a first portion which receives said armature, and a second portion which carries connector means for electrically connecting said module to other electrical components of the anti-lock brake system, said connector means including conductor members extending into said second portion;

a solenoid coil carried by said first portion of said coil support module for actuating said valve, said solenoid coil surrounding said armature, said solenoid coil having a pair of electrical coil conductors connected thereto;

said coil support module including first and second components which cooperate with one another to define a cavity which in part functions to separate said first and second portions;

said coil conductors extending from said first-portion through said cavity and into said second portion, wherein said solenoid coil includes a winding wound from a piece of wire, said wire including an end extending from said coil to form said coil conductor;

coupling means disposed within said second portion for electrically coupling said coil conductors to said conductor members; and a potting material disposed in said cavity and sealingly contacting said first and second components and said coil conductors, said first and second components and said potting material cooperating to close said second portion to seal said coupling means from the environment.

2. The control valve, as described in claim 1, wherein said cavity defines a channel.

3. The control valve, as described in claim 1, wherein said second component includes a potting dam.

4. The control valve, as described in claim 1, wherein said second component forms a cover for said coil support module.

5. The control valve, as described in claim 1, wherein said coupling means includes a printed circuit board.

6. The control valve, as described in claim 5, wherein said printed circuit board carries means for controlling the anti-lock brake system.

7. The control valve, as described in claim 1, wherein said potting material is resilent and self-curing.

8. The control valve, as described in claim 1, wherein said coil support module second portion cooperates with said connector means to define a channel, said channel having said potting material disposed therein to form a seal between said second portion and said connector means.

9. The control valve, as described in claim 1, wherein said potting material sealingly covers said coupling means.

\* \* \* \* \*